United States Patent

Kim

(10) Patent No.: US 9,258,023 B2
(45) Date of Patent: Feb. 9, 2016

(54) DIVERSITY ANTENNA APPARATUS OF MOBILE TERMINAL AND IMPLEMENTATION METHOD THEREOF

(75) Inventor: Hak-Joon Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1024 days.

(21) Appl. No.: 11/852,093

(22) Filed: Sep. 7, 2007

(65) Prior Publication Data

US 2008/0064436 A1    Mar. 13, 2008

(30) Foreign Application Priority Data

Sep. 7, 2006   (KR) .................. 10-2006-0086078

(51) Int. Cl.
  *H04B 1/3805*  (2015.01)
  *H04B 7/08*    (2006.01)
  *H01Q 1/24*    (2006.01)
  *H01Q 21/28*   (2006.01)

(52) U.S. Cl.
  CPC ............ *H04B 1/3805* (2013.01); *H01Q 1/242* (2013.01); *H01Q 21/28* (2013.01); *H04B 7/0817* (2013.01); *H04B 7/0842* (2013.01); *H04B 7/0871* (2013.01)

(58) Field of Classification Search
  None
  See application file for complete search history.

(56) References Cited

U.S. PATENT DOCUMENTS

| | | | |
|---|---|---|---|
| 6,504,511 B2 * | 1/2003 | Andersson | 343/702 |
| 6,560,443 B1 | 5/2003 | Vaisanen et al. | |
| 2003/0017811 A1 * | 1/2003 | Hoshi | 455/101 |
| 2003/0050032 A1 * | 3/2003 | Masaki | 455/272 |
| 2003/0153358 A1 * | 8/2003 | Moon et al. | 455/561 |
| 2004/0053526 A1 | 3/2004 | Godfrey | |
| 2005/0245201 A1 * | 11/2005 | Ella et al. | 455/78 |
| 2006/0025171 A1 * | 2/2006 | Ly et al. | 455/553.1 |
| 2006/0252418 A1 * | 11/2006 | Quinn et al. | 455/423 |
| 2007/0025246 A1 * | 2/2007 | Pirzada et al. | 370/230 |

FOREIGN PATENT DOCUMENTS

| KR | 1020060083465 | 7/2006 |
|---|---|---|
| WO | WO 2004/049594 | 6/2004 |

* cited by examiner

*Primary Examiner* — Marcus R Smith
(74) *Attorney, Agent, or Firm* — The Farrell Law Firm, P.C.

(57) ABSTRACT

Provided is a diversity antenna apparatus of a mobile terminal including a main antenna and a sub-antenna for performing an auxiliary function using a separate sub-antenna processing module, and an implementation method thereof. When the auxiliary function is not performed, a controller of the mobile terminal disconnects the sub-antenna from the sub-antenna processing module and electrically connects the sub-antenna to an RF module through a switch such that the sub-antenna operates as a diversity antenna.

4 Claims, 2 Drawing Sheets

DIVERSITY ANTENNA APPARATUS OF MOBILE TERMINAL AND IMPLEMENTATION METHOD THEREOF

PRIORITY

This application claims priority under 35 U.S.C. §119(a) to a Korean Patent application filed in the Korean Intellectual Property Office on Sep. 7, 2006 and assigned Serial No. 2006-86078, the contents of which are incorporated herein by reference.

BACKGROUND OF THE INVENTION

1. Field of the Invention

The present invention relates generally to an antenna apparatus of a mobile terminal, and in particular, to a diversity antenna apparatus for enabling a sub-antenna used for an auxiliary function to selectively operate as a diversity antenna without a separate diversity antenna, thereby achieving a size reduction of the mobile terminal, and an implementation method of the diversity antenna apparatus.

2. Description of the Related Art

A mobile terminal generally uses various frequencies. Also, in the mobile terminal, a fading phenomenon, in which a Transmit/Receive (Tx/Rx) signal level fluctuates according to external environments, frequently occurs. A diversity antenna apparatus is used to prevent deterioration of Tx/Rx characteristics due to the fading phenomenon.

The diversity antenna apparatus, which transmits/receives a signal using two antennas, enables only one antenna in a high electric field region, and enables two antennas at the same time in a low electric field region, or when the operational environment surrounding user's mobile terminal deteriorates due to his movement, thereby preventing the deterioration of Tx/Rx sensitivity of the mobile terminal.

However, as described above, because the diversity antenna apparatus includes two antennas installed in the mobile terminal, the apparatus goes against a current slimness trend of mobile terminals.

SUMMARY OF THE INVENTION

An object of the present invention is to substantially solve at least the above problems and/or disadvantages and to provide at least the advantages below. Accordingly, an object of the present invention is to provide a diversity antenna apparatus and an implementation method of the diversity antenna apparatus, for enabling a pre-installed sub-antenna, which is used for an auxiliary function, to selectively operate as a diversity antenna, thereby eliminating the need for a separate diversity antenna.

Another object of the present invention is to provide a diversity antenna apparatus and an implementation method of the diversity antenna apparatus, for enabling a pre-installed sub-antenna to selectively operate as a diversity antenna, thereby preventing increase in size of the mobile terminal due to the additional installation of a separate diversity antenna.

Still another object of the present invention is to provide a diversity antenna apparatus and an implementation method of the diversity antenna apparatus, for preventing the additional installation of a separate diversity antenna and the size increase of the mobile terminal, thereby achieving cost reduction and call quality improvement in the mobile terminal.

According to one aspect of the present invention, a diversity antenna apparatus includes a main antenna, a sub-antenna for performing an auxiliary function of the mobile terminal, the sub-antenna operating in a frequency band identical or similar to a frequency band for the main antenna, a first Radio Frequency (RF) module for transmitting/receiving a signal through the main antenna, a second RF module installed separately from the first RF module, a sub-antenna processing module for transmitting/receiving a signal through the sub-antenna, a switch provided on a feed line of the sub-antenna, for selectively connecting the second RF module or the sub-antenna processing module to the sub-antenna, and a controller for controlling the switch in accordance with the operation state of the mobile terminal and enabling the sub-antenna to selectively operate as a diversity antenna of the mobile terminal.

According to another aspect of the present invention, a method for implementing a diversity antenna apparatus of a mobile terminal including a main antenna and a sub-antenna for performing an auxiliary function using a sub-antenna processing module, the method includes disconnecting, at a controller of the mobile terminal, the sub-antenna from the sub-antenna processing module to electrically connect the sub-antenna to an RF module through a switch such that the sub-antenna operates as a diversity antenna when the auxiliary function is not performed.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
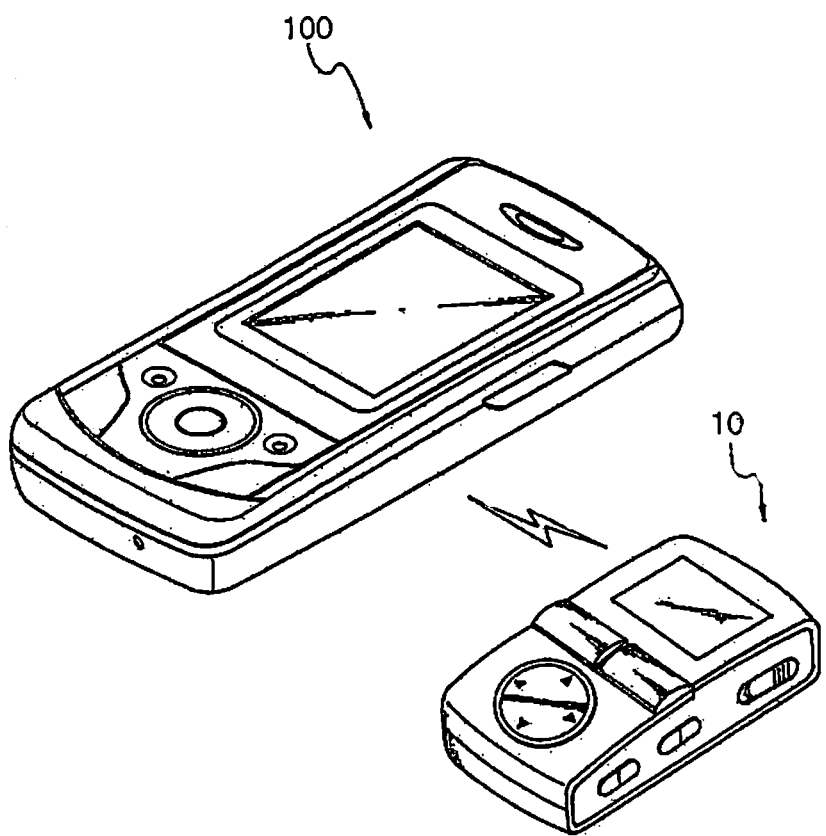
FIG. 1 is a perspective view of a mobile terminal including a Bluetooth® (hereinafter "Bluetooth") module according to the present invention.

FIG. 1 is a perspective view of a mobile terminal including a Bluetooth module according to the present invention. FIG. 1 illustrates a mobile terminal 100 and a Bluetooth device 10 for wireless communication in 2.4 GHz band. Thus, a main board (not shown) installed in the mobile terminal 100 includes a main antenna for the signal transmission/reception of the mobile terminal, and a Bluetooth module for wireless communication with the Bluetooth device 10. The main antenna, the Bluetooth module, and a Bluetooth antenna may be mounted on the main board in a plate type, a chip set type, and a known chip antenna type, respectively.

However, a sub-antenna according to the present invention is not limited to the Bluetooth antenna, and various sub-antennas corresponding to modules for performing auxiliary functions may be mounted. The sub-antennas may be installed in the mobile terminal and operate in various bands. For example, the present invention includes a main antenna applied to a Universal Mobile Telecommunications System (UMTS) 2100 type terminal operating in 2.1 GHz band, so that sub-antennas, which correspond to the Bluetooth module, a Wireless Broadband (WiBro) module, a Wireless Local Loop (WLL) module, and a Wireless Fidelity (WiFi) module operating in similar band to the 2.1 GHz band, can be used.

Figure 2:
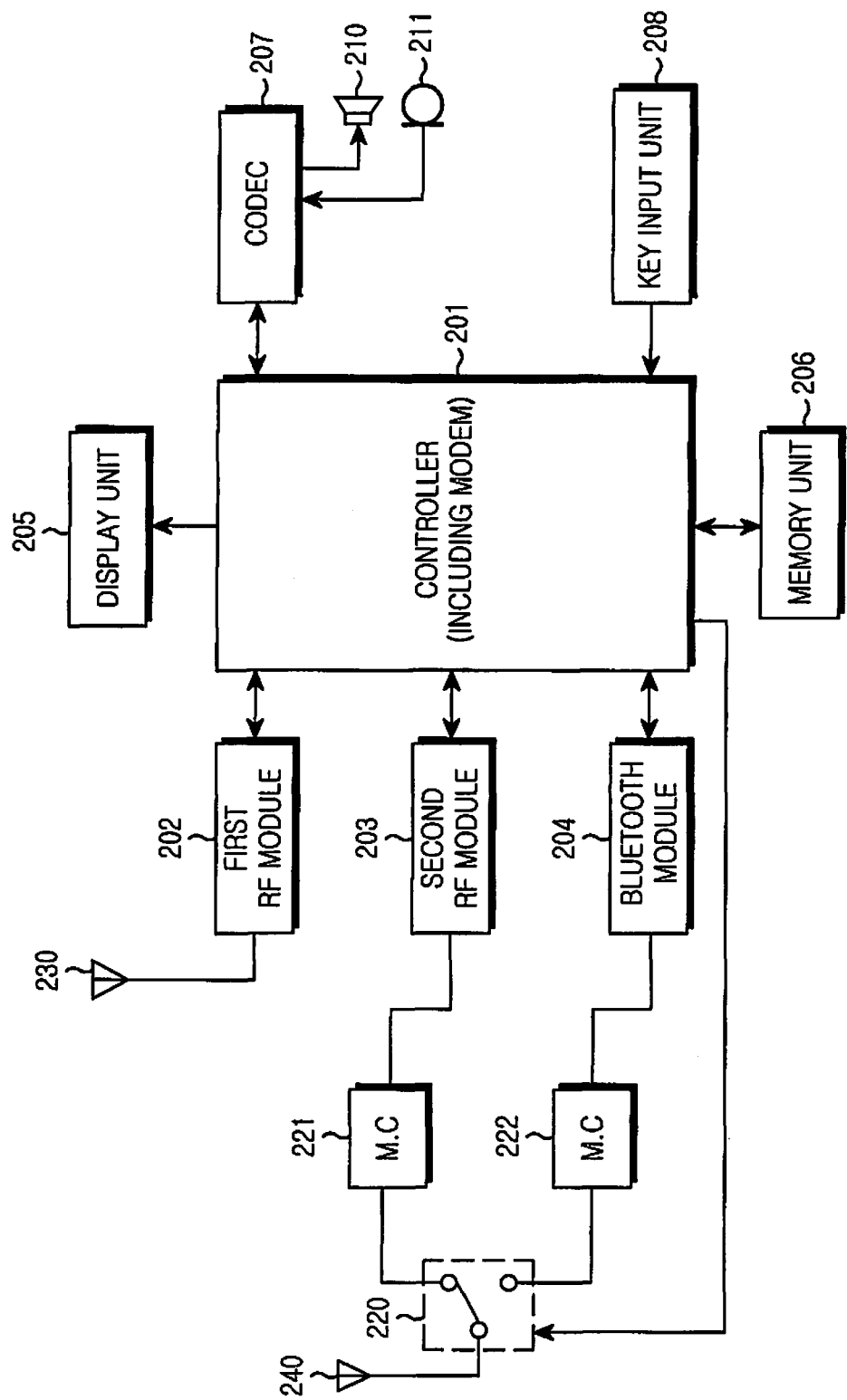
FIG. 2 is a block diagram of a mobile terminal according to the present invention.

FIG. 2 is a block diagram of a mobile terminal according to the present invention. In this mobile terminal, a controller 201 includes a modem for processing Tx/Rx signals of first and second RF modules 202 and 203, respectively. The first and second RF modules 202, 203 may be designed into a single RF module that can separately process Tx/Rx signals with respect to respective antennas.

A main antenna 230 according to the present invention is electrically connected to the first RF module 202 that processes Tx/Rx signals with respect to the main antenna 230. A sub-antenna 240 is electrically connected to the second RF module 203 or a Bluetooth module 204 through a switch 220. The switch 220 is controlled by the controller 201 and may be implemented using a known Single Pole, Double Throw (SPDT) switch.

The controller 201 can automatically control the switch 220 according to a use environment of the mobile terminal. For example, when the mobile terminal performs a Bluetooth function, the controller 201 controls the switch 220 such that the sub-antenna 240 is connected to the Bluetooth module 204. However, when the mobile terminal does not perform the Bluetooth function, the controller 201 controls the switch 220 such that the sub-antenna 240 is connected to the second RF module 203 and the sub-antenna 240 can operate as a diversity antenna.

A matching circuit 221 may be provided on a feed line between the switch 220 and the second RF module 203. Similarly, a matching circuit 222 may be provided on a feed line between the switch 220 and the Bluetooth module 204. The matching circuits 221 and 222 may be constructed using passive elements such as an inductor and a capacitor. Consequently, the matching circuit 221 may be used for frequency matching corresponding to a frequency used by the sub-antenna 240 operating as the diversity antenna, and the matching circuit 222 may be used for frequency matching corresponding to a frequency used by the sub-antenna 240 operating as the Bluetooth antenna.

Preferably, a difference between frequency bands used by the main antenna 230 and the sub-antenna 240 is less than or equal to f/8, where f is the frequency band of the main antenna. For example, when the main antenna 230 of FIG. 2 operates in 2.1 GHz band as a UMTS 2100 RX band, it is preferable that the frequency band of the sub-antenna 240 is not more than approximately 260 MHz greater than or less than the 2.1 GHz band.

Thus, it is preferable that the sub-antenna 240 is set to operate in 2.25 GHz band between the 2.4 GHz band used by the Bluetooth antenna and the 2.1 GHz band used by the main antenna. That is, under the control of the switch 220, the sub-antenna 240 using 2.25 GHz band operates as the diversity antenna using the 2.1 GHz band or the Bluetooth antenna using the 2.4 GHz band through the matching circuit 221 or the matching circuit 222, respectively.

However, the method of using the matching circuit according to the present invention is not limited to the specific case described above. For example, the sub-antenna 240 may be set to operate in the frequency band used by the Bluetooth antenna, and a matching circuit is provided only on the feed line between the sub-antenna 240 and the second RF module such that the matching circuit performs frequency matching only when the sub-antenna 240 is used as the diversity antenna.

A display unit 205, a memory unit 206, a COder-DECoder (CODEC) 207, a key input unit 208, a microphone 211, and a speaker 210 are well-known components, and thus their description will be omitted for conciseness.

The antenna apparatus according to the present invention can allow the sub-antenna, which is used for the auxiliary function, to selectively operate as the diversity antenna, so that it does not require a separate diversity antenna. Therefore, saving space and reducing cost, and high quality mobile terminal production, due to the improvement of Tx/Rx sensitivity, can be implemented.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An antenna apparatus of a mobile terminal, the apparatus comprising:
a first antenna using a first frequency band;
a second antenna configured to perform an auxiliary function of the mobile terminal and using a second frequency band that is different from the first frequency band;
a first Radio Frequency (RF) module configured to transmit/receive a first signal of the first frequency band through the first antenna to which the first RF module is always connected;
a second RF module installed separately from the first RF module and configured to transmit/receive a second signal of the first frequency band through the second antenna and a first matching circuit;
a third RF module configured to transmit/receive a third signal of a third frequency band, which is different from the first frequency band, through the second antenna and a second matching circuit, and perform the auxiliary function;
the first matching circuit provided on a first line between the second antenna and the second RF module so that the second antenna is used for the first frequency band;
the second matching circuit provided on a second line between the second antenna and the third RF module so that the second antenna is used for the third frequency band;
a switch provided on a feed line of the second antenna and configured to switch a connection with the second antenna between the first matching circuit and the second matching circuit, while the first RF module remains connected to the first antenna; and
a controller configured to control the switch based on execution of the auxiliary function, wherein when the auxiliary function is not executed, the controller is configured to switch the second antenna from the third RF module to the second RF module so that the second antenna is used for the second RF module, thereby configuring a diversity antenna by using both the first antenna and the second antenna, and
when the auxiliary function is executed, the controller is configured to switch the second antenna from the second RF module to the third RF module so that the second antenna is used for the third RF module.

2. The apparatus of claim 1, wherein at least one of the first matching circuit and the second matching circuit includes passive elements.

3. The apparatus of claim 2, wherein the first RF module operates through the first antenna in a Universal Mobile Telecommunications System (UMTS) 2100 Receive (RX) band of a 2.1 GHz band.

4. The apparatus of claim 3, wherein the auxiliary function includes at least one of a Bluetooth function, a Wireless Fidelity (WiFi) function, a Wireless Local Loop (WLL) function and a Wireless Broadband (WiBro) function.

\* \* \* \* \*